United States Patent
Fournier et al.

(10) Patent No.: US 10,649,717 B2
(45) Date of Patent: May 12, 2020

(54) METHODS AND SYSTEMS FOR CONVEYING ENCRYPTED DATA TO A COMMUNICATION DEVICE

(71) Applicant: NAGRAVISION S.A., Cheseaux-sur-Lausanne (CH)

(72) Inventors: Jean-Claude Fournier, Noyal-sur-Vilaine (FR); Bernard Benoit, Renens (CH); Bertrand Wendling, Divonne-les-Bains (FR); Andre Kudelski, Cheseaux (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 15/871,829

(22) Filed: Jan. 15, 2018

(65) Prior Publication Data

US 2018/0157460 A1   Jun. 7, 2018

Related U.S. Application Data

(63) Continuation of application No. 14/727,661, filed on Jun. 1, 2015, now Pat. No. 9,891,882.

(51) Int. Cl.
*H04B 15/02* (2006.01)
*H04K 1/02* (2006.01)
(Continued)

(52) U.S. Cl.
CPC ............ *G06F 3/165* (2013.01); *G06F 1/1626* (2013.01); *G06F 1/1632* (2013.01);
(Continued)

(58) Field of Classification Search
None
See application file for complete search history.

(56) References Cited

U.S. PATENT DOCUMENTS

| | | | |
|---|---|---|---|
| 5,128,996 A | 7/1992 | Rosenow | |
| 5,150,410 A | 9/1992 | Bertrand | |

(Continued)

FOREIGN PATENT DOCUMENTS

| | | |
|---|---|---|
| CN | 1585539 | 2/2005 |
| CN | 1283063 | 11/2006 |

(Continued)

OTHER PUBLICATIONS

Encrypted CDMA Audio Network. Ortega et al. Journal of Information Security. (Year: 2014).*

(Continued)

*Primary Examiner* — Venkat Perungavoor
(74) *Attorney, Agent, or Firm* — Oblon, McClelland, Maier & Neustadt, L.L.P.

(57) ABSTRACT

An apparatus includes an audio-sensor inhibitor configured to inhibit detection of sound by an audio sensor of a communication device, and a secure communication interface coupled to the audio-sensor inhibitor, the secure communication interface being configured to transmit encrypted audio data from the secure communication interface to the communication device, wherein the communication interface generates audio data using a secure-interface audio sensor, and generates the encrypted audio data by encrypting the audio data using a cryptographic module.

20 Claims, 9 Drawing Sheets

(51) Int. Cl.
- *G06F 3/16* (2006.01)
- *H04M 1/60* (2006.01)
- *H04L 29/06* (2006.01)
- *G10L 99/00* (2013.01)
- *G10L 21/0208* (2013.01)
- *G06F 1/16* (2006.01)
- *G06F 21/83* (2013.01)
- *H04K 3/00* (2006.01)

(52) U.S. Cl.
CPC .......... *G06F 1/1656* (2013.01); *G06F 1/1684* (2013.01); *G06F 21/83* (2013.01); *G10L 21/0208* (2013.01); *G10L 99/00* (2013.01); *H04L 63/0428* (2013.01); *H04M 1/6066* (2013.01); *G06F 2200/1633* (2013.01)

(56) References Cited

U.S. PATENT DOCUMENTS

| | | |
|---|---|---|
| 5,454,037 A | 9/1995 | Pacella |
| 5,535,276 A | 7/1996 | Ganesan |
| 5,818,738 A | 10/1998 | Effing |
| 5,825,878 A | 10/1998 | Takahashi |
| 6,373,946 B1 | 4/2002 | Johnston |
| 6,742,116 B1 | 5/2004 | Matsui |
| 6,965,992 B1 | 11/2005 | Joseph |
| 7,024,393 B1 | 4/2006 | Peinado |
| 7,133,521 B2 | 11/2006 | Jabri |
| 7,139,222 B1* | 11/2006 | Baxter ............ G01S 5/18 367/127 |
| 7,149,896 B1 | 12/2006 | Bahl |
| 7,167,897 B2 | 1/2007 | Riddle |
| 7,310,730 B1 | 12/2007 | Champagne |
| 7,350,070 B2 | 3/2008 | Smathers |
| 7,558,529 B2 | 7/2009 | Seshadri |
| 7,627,289 B2 | 12/2009 | Huddart |
| 7,680,273 B2 | 3/2010 | Whitehead |
| 7,734,802 B1 | 6/2010 | Gay |
| 7,869,594 B2 | 1/2011 | Tsurumoto |
| 8,078,787 B2 | 12/2011 | Lydon |
| 8,103,210 B2 | 1/2012 | Tamura |
| 8,200,959 B2 | 6/2012 | Wing |
| 8,228,861 B1 | 7/2012 | Nix |
| 8,379,921 B1 | 2/2013 | Golan |
| 8,477,661 B2 | 7/2013 | Saleem |
| 8,738,916 B2 | 5/2014 | Klassen |
| 8,761,184 B1 | 6/2014 | Ho |
| 8,862,129 B2 | 10/2014 | Moshir |
| 9,369,445 B2 | 6/2016 | Mahajan |
| 9,480,096 B1 | 10/2016 | Lee |
| 9,569,638 B2 | 2/2017 | Zatko |
| 2002/0002683 A1 | 1/2002 | Benson |
| 2002/0009180 A1 | 1/2002 | Weirich |
| 2002/0058515 A1 | 5/2002 | Holler |
| 2002/0093948 A1 | 7/2002 | Dertz |
| 2002/0098878 A1 | 7/2002 | Mooney |
| 2002/0122401 A1 | 9/2002 | Xiang |
| 2003/0018705 A1 | 1/2003 | Chen |
| 2003/0046539 A1 | 3/2003 | Negawa |
| 2003/0059005 A1 | 3/2003 | Meyerson |
| 2003/0088618 A1 | 5/2003 | Sueyoshi |
| 2003/0235308 A1 | 12/2003 | Boynton |
| 2004/0109409 A1 | 6/2004 | Simpson |
| 2005/0073575 A1 | 4/2005 | Thacher |
| 2005/0154793 A1 | 7/2005 | Khartabil |
| 2005/0154973 A1 | 7/2005 | Otsuka |
| 2005/0198379 A1 | 9/2005 | Panasyuk |
| 2005/0198380 A1 | 9/2005 | Panasyuk |
| 2005/0273510 A1 | 12/2005 | Schuh |
| 2006/0050883 A1 | 3/2006 | Walker |
| 2006/0101288 A1 | 5/2006 | Smeets |
| 2006/0165060 A1 | 7/2006 | Dua |
| 2006/0198520 A1 | 9/2006 | Courtney |
| 2007/0018334 A1 | 1/2007 | Peytavy |
| 2007/0047711 A1 | 3/2007 | Florkey |
| 2007/0203698 A1 | 8/2007 | Mapes-Riordan et al. |
| 2007/0263798 A1 | 11/2007 | Dewing |
| 2007/0294346 A1 | 12/2007 | Moore |
| 2008/0010674 A1 | 1/2008 | Lee |
| 2008/0034421 A1 | 2/2008 | Ahn |
| 2008/0037447 A1 | 2/2008 | Garg |
| 2008/0046731 A1 | 2/2008 | Wu |
| 2008/0130894 A1 | 6/2008 | Qj |
| 2008/0146290 A1 | 6/2008 | Sreeram |
| 2008/0165707 A1 | 7/2008 | Baird |
| 2008/0171579 A1 | 7/2008 | Grubek |
| 2008/0263363 A1 | 10/2008 | Jueneman |
| 2008/0320190 A1 | 12/2008 | Lydon |
| 2009/0097628 A1 | 4/2009 | Yap |
| 2009/0147958 A1 | 6/2009 | Calcaterra |
| 2009/0150668 A1 | 6/2009 | Liu |
| 2009/0168978 A1 | 7/2009 | Laws |
| 2009/0296932 A1 | 12/2009 | Pilavic |
| 2010/0151788 A1* | 6/2010 | Rahman ............ H04M 1/6066 455/41.2 |
| 2010/0217982 A1 | 8/2010 | Brown |
| 2010/0293462 A1 | 11/2010 | Bull |
| 2011/0028136 A1 | 2/2011 | Frazier |
| 2011/0047383 A1 | 2/2011 | Klassen |
| 2011/0150216 A1 | 6/2011 | Barry |
| 2011/0251899 A1 | 10/2011 | Proulx |
| 2012/0005475 A1 | 1/2012 | Inagaki |
| 2012/0083208 A1 | 4/2012 | Giles |
| 2012/0198531 A1 | 8/2012 | Ort |
| 2012/0204029 A1 | 8/2012 | Trabucco |
| 2012/0252531 A1 | 10/2012 | King |
| 2012/0257750 A1 | 10/2012 | Bohm |
| 2012/0258726 A1 | 10/2012 | Bansal |
| 2012/0291095 A1 | 11/2012 | Narendra |
| 2012/0316869 A1 | 12/2012 | Xiang et al. |
| 2013/0018975 A1 | 1/2013 | Higgins |
| 2013/0170361 A1 | 7/2013 | Manyakin |
| 2013/0252583 A1 | 9/2013 | Brown |
| 2013/0273889 A1 | 10/2013 | Lobmaier |
| 2013/0336161 A1 | 12/2013 | Jung |
| 2013/0339754 A1 | 12/2013 | Takashima |
| 2014/0033279 A1 | 1/2014 | Nimashakavi |
| 2014/0033280 A1 | 1/2014 | Nimashakavi |
| 2014/0280982 A1 | 9/2014 | Patel |
| 2014/0301249 A1 | 10/2014 | Moss |
| 2014/0366105 A1 | 12/2014 | Bradley |
| 2015/0031288 A1 | 1/2015 | Tubbesing |
| 2015/0059251 A1 | 3/2015 | Rinner |
| 2015/0089569 A1 | 3/2015 | Sondhi |
| 2015/0106020 A1* | 4/2015 | Chung ............ G16H 50/30 702/19 |
| 2015/0222601 A1 | 8/2015 | Metz |
| 2015/0237019 A1 | 8/2015 | Rohloff |
| 2015/0281945 A1* | 10/2015 | Seo ............ H04M 1/271 455/419 |
| 2015/0319518 A1* | 11/2015 | Wilson ............ H04R 1/10 381/71.6 |
| 2015/0319684 A1 | 11/2015 | Okamoto |
| 2015/0365400 A1 | 12/2015 | Cox |
| 2016/0014579 A1 | 1/2016 | Kasilya Sudarsan |
| 2016/0028696 A1 | 1/2016 | Howe |
| 2016/0085566 A1 | 3/2016 | Benzaia |
| 2016/0088476 A1 | 3/2016 | Park |
| 2016/0234356 A1 | 8/2016 | Thomas |
| 2016/0234366 A1 | 8/2016 | De Filippis |

FOREIGN PATENT DOCUMENTS

| | | |
|---|---|---|
| CN | 101340433 | 7/2009 |
| EP | 1863301 | 2/2010 |
| EP | 2175580 | 4/2010 |
| EP | 2262143 | 12/2010 |
| GB | 2388279 | 11/2003 |
| GB | 2420251 | 5/2006 |
| WO | 2008129546 | 10/2008 |

(56) References Cited

FOREIGN PATENT DOCUMENTS

| WO | 2012024903 | 3/2012 |
|---|---|---|
| WO | 2013121275 | 8/2013 |

OTHER PUBLICATIONS

PriWhisper: Enabling Keyless Secure Acoustic Communication for Smartphones. Zhang et al. IEEE. (Year: 2014).*
Speaker Identification using Voice-Based Cryptography for Mobile VoIP Secure Voice Communications Ryu et al. IEEE. (Year: 2013).*
Evaluation of Privacy Protection Techniques for Speech Signals. Springer-Verlag Hiedelberg. (Year: 2010).*
A Cryptographicaly Protected Phone System. Erbsen et al. (Year: 2014).*
Wireless Digital Stethoscope using Bluetooth Technology. Mills et al. IJREST. (Year: 2012).*
Dhwani: Secure Peer-toPeer Acoustic NFC. Nandakumar et al. ACM (Year: 2013).*
Chumchu, P., et al., "A simple and Cheap End-to-End Voice Encryption Framework over GSM-based networks", Computing, Communications and Applications Conference (Comcomap), 2012, IEEE, Jan. 11, 2012, XPO32117819, DOI: 10.1109/COMCOMAP. 2012.6154800, ISBN: 978-1-4577-1717-8.
Notification of Transmittal of the International Search Report and The Written Opinion of the International Searching Authority, or the Declaration, for PCT/EP2016/062375, dated Sep. 8, 2016, 12 pages.
Petersen, M., "Voice and Data Encryption Module for Attachment to Portable Cellular Telephone", Motorola Technical Developments, Motorola Inc., Schaumburg, IL, US, vol. 38, Jun. 1, 1991, pp. 32-34 XP000906022, ISSN: 0887-5286.
Menezes, et al., "Handbook of Applied Cryptography", 1997, ISBN: 0848385237.
International Search Report and Written Opinion for PCT/EP2016/061966 dated Aug. 19, 2016, 10 pages.
Lefebvre, R., Set Incoming Calls to Headset or Speaker on Your iPhone With iOS 7 Beata [iOS Tips]:, 7/13, found on www.cultofmac.com.
Jabra Product Guide. 2009.
Notification of Transmittal of the International Search Report and The Written Opinion of the International Searching Authority, or the Declaration, for PCT/EP2016/061975, dated Jul. 1, 2016, 11 pages.
Menezes, et al. Handbook of Applied Cryptography, 1996, XP001525001.
International Search Report and Written Opinion for PCT/EP2016/062578 dated Aug. 4, 2016, 8 pages.
Reference Manual and operating Instructions Nagra Seven. Nagra. Mar. 2014.
CN 105025404. Google English Translation. Apr. 21, 2014.
CN 101227279 v. Google English Translation. Jul. 23, 2008.
Examination Report No. 1 issued in corresponding Australian Application No. 2016273217 dated Nov. 29, 2018.
Examination Report No. 2 issued in corresponding Australian Application No. 2016273217 dated May 28, 2019.

* cited by examiner

METHODS AND SYSTEMS FOR CONVEYING ENCRYPTED DATA TO A COMMUNICATION DEVICE

CROSS REFERENCE TO RELATED APPLICATIONS

The present application is a continuation of, and claims benefit under 35 U.S.C. § 120 from, U.S. patent application Ser. No. 14/727,661, filed Jun. 1, 2015, entitled "METHODS AND SYSTEMS FOR CONVEYING ENCRYPTED DATA TO A COMMUNICATION DEVICE", and which is hereby incorporated by reference in its entirety.

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld (as may be the case for a walkie-talkie), body-mounted, or attached to a vehicle (such as the roof of a car), as examples.

Given the relative ease with which communication signals can be intercepted, communication with (or between) personal mobile devices is often encrypted to prevent interception of the communication by third parties. Encryption is the process of converting audible voice or other clear data into unintelligible voice or encrypted data, respectively, while decryption is the process of converting the unintelligible voice back to the original audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

OVERVIEW

Disclosed herein are methods and systems for conveying encrypted data to a communication device. In at least one embodiment, an apparatus includes an audio-sensor inhibitor configured to inhibit detection of sound by an audio sensor of a communication device, and a secure communication interface coupled to the audio-sensor inhibitor, the secure communication interface is configured to transmit encrypted audio data from the secure communication interface to the communication device, wherein the communication interface generates audio data using a secure-interface audio sensor, and generates the encrypted audio data by encrypting the audio data using a cryptographic module.

In at least one embodiment, the audio-sensor inhibitor includes an acoustic dampening material.

In at least one embodiment, the audio-sensor inhibitor includes a transducer to output a noise signal. In a further embodiment, the audio-sensor inhibitor further includes a signal generator configured to generate, via the transducer, a noise signal.

In at least one embodiment, the noise signal is one or more of pink noise, white noise, and random noise.

In at least one embodiment, the signal generator generates, via the transducer, the noise signal in response to a triggering event. In one such embodiment, the triggering event includes commencement of an encrypted communication session.

In at least one embodiment, the signal generator generates the noise signal for a duration of an encrypted communication session.

In at least one embodiment, the apparatus further comprises a noise-cancellation module configured to remove noise-signal components from sound detected by the secure-interface audio sensor.

In at least one embodiment, wherein when the apparatus is disposed on the communication device, the audio-sensor inhibitor is positioned adjacent to the audio-sensor of the communication device.

In at least one embodiment, the accessory further comprises an image-sensor inhibitor disposed on the accessory, wherein when the apparatus is disposed on the communication device and the communication device further comprises an image sensor, the image-sensor inhibitor is configured to obscure the image sensor of the communication device. In one such embodiment, the image-sensor inhibitor is one or more of a non-transparent covering and a light source.

In at least one embodiment, the secure communication interface communicates the encrypted audio data from the secure communication interface to the communication device via a communication link.

In at least one embodiment, the secure communication interface is further configured to decrypt an inbound encrypted audio data received from the communication device.

In at least one embodiment, an apparatus comprises an audio-sensor inhibitor to inhibit detection of sound by an audio sensor of a communication device, and a communication interface coupled to the audio-sensor inhibitor, the communication interface being configured to receive an inbound wireless communication data transmitted from an external accessory that includes a secure communication interface, the inbound wireless communication data including encrypted audio data, the communication interface including a communication link to enable relay of the encrypted audio data between the communication interface and the communication device.

In at least one embodiment, the communication interface enables transmission of an outbound wireless communication data to the external accessory, the outbound wireless communication data including encrypted audio data received from the communication device.

In at least one embodiment, the communication interface is a personal area network (PAN) wireless-communication interface.

In at least one embodiment, the external accessory is a Bluetooth-enabled headset.

In an alternative embodiment, the audio-sensor inhibitor includes an acoustic dampening material.

In an alternative embodiment, the audio-sensor inhibitor includes a transducer to output a noise signal.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
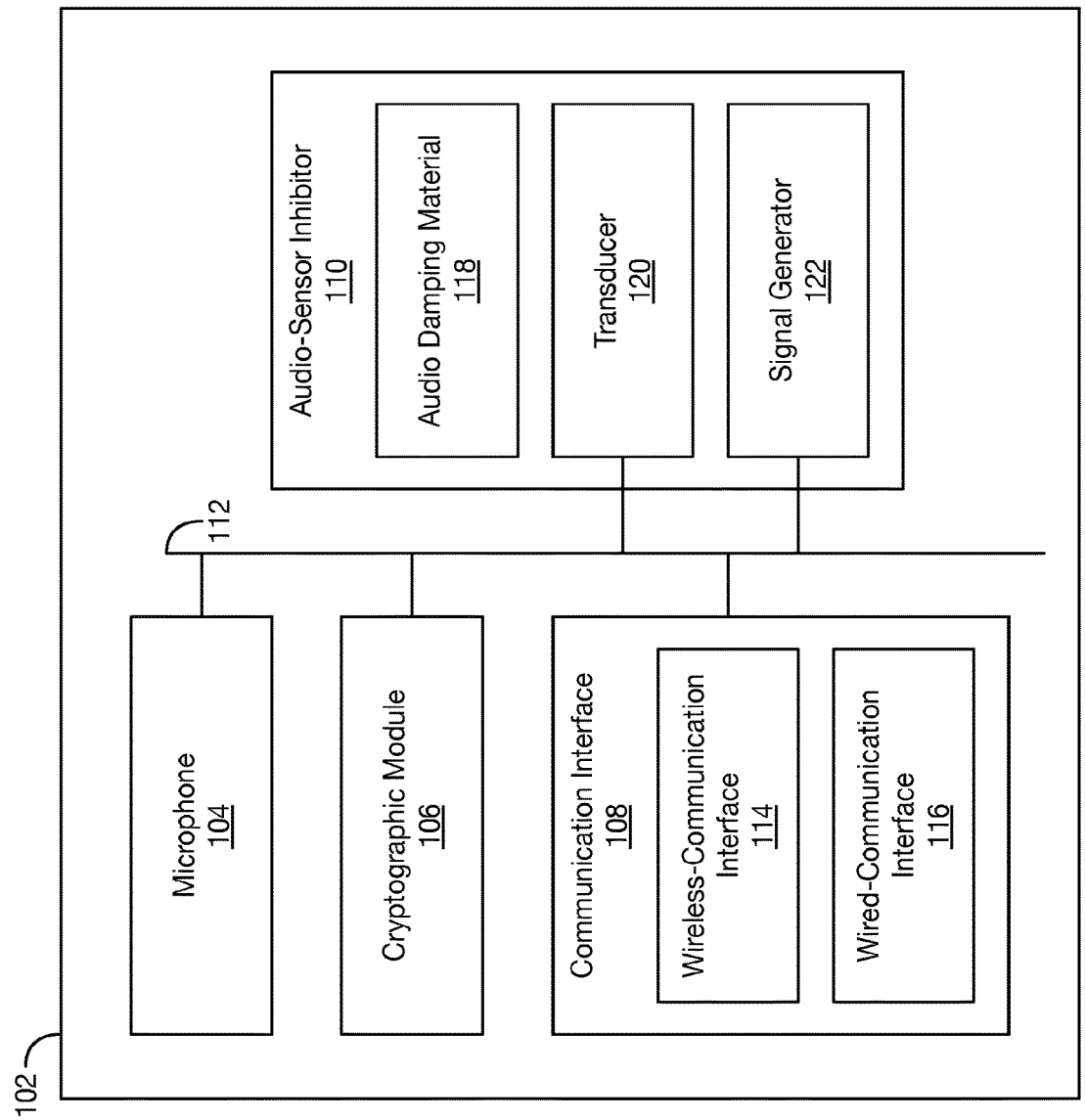
FIG. 1 depicts a block diagram of an accessory, in accordance with at least one embodiment.

FIG. 1 depicts a block diagram of an accessory, in accordance with at least one embodiment. As shown, an accessory 102 includes a microphone 104, a cryptographic module 106, a communication interface 108, and an audio-sensor inhibitor 110, all of which are interconnected via a system bus 112. The microphone 104, the cryptographic module 106, and the communication interface 108 are all disposed on the housing. The audio-sensor inhibitor is arranged to be positioned adjacent to a communication-device audio sensor. Those having skill in the relevant art will appreciate that accessory 102 could have additional and/or different components, and perhaps a different arrangement of components, among many other possible variations that could be listed here.

Microphone 104 could take the form of (or include) a condenser microphone, a dynamic microphone, a ribbon microphone, a carbon microphone, a piezoelectric microphone, a fiber optic microphone, a laser microphone, a liquid microphone, a MEMS microphone, and/or any other microphone, as is known to one of skill in the art. The microphone 104 detects sound and conveys the detected sound to the cryptographic module 106 via the communication bus 112.

Cryptographic module 106 could take the form of hardware and/or software for performing cryptographic functions or processes—e.g., cryptographic algorithms and/or key generation. In an embodiment, cryptographic module 106 is contained within an explicitly defined perimeter that establishes the physical bounds of the cryptographic module and that contains any processors and/or other hardware components that store and protect any software and firmware components of the cryptographic module. Cryptographic module 106 could take the form of (or include) a secure crypto-processor, a smart card, a secure digital (SD) card, a micro SD card, a subscriber identity module (SIM) card, and/or any other cryptographic module, as known to one of skill in the art. The cryptographic module 106, in communication with the microphone 104 via the system bus 112, may generate encrypted audio data based on the detected sound. In some embodiments, the cryptographic module 106 generates encrypted audio data during at least an encrypted communication session.

Communication interface 108 (including wireless communication interface 114 and/or wired communication interface 116) may include any necessary hardware (e.g., chipsets, antennas, Ethernet cards, etc.), any necessary firmware, and/or any necessary software for conducting one or more forms of communication with one or more other components and/or entities. The communication interface 108, in communication with the cryptographic module 106, conveys the encrypted audio data to the communication device.

Wireless communication interface 114 may be configured to communicate according to one or more wireless-communication protocols such as Long-Term Evolution (LTE), Global System for Mobile Communications (GSM), CDMA2000, IEEE 802.11 (Wi-Fi), and/or Bluetooth, among other protocols that will be known to those having skill in the relevant art for a given implementation or in a given context. Similarly, wired communication interface 116 may be configured to communicate according to one or more wired-communication protocols such as Ethernet, Universal Serial Bus (USB), Apple Lightning™, Intel/Apple Thunderbolt™, and the like, among numerous other possibilities.

Though communication interface 108 is depicted as including both a wireless communication interface 114 and a wired communication interface 116, those of skill in the art will appreciate that communication interface 108 may contain different and/or additional communication interfaces. For example, an embodiment of communication interface 108 could include only wireless interface 114, or only wired communication interface 116.

Audio-sensor inhibitor 110 may take the form of (or include) sound-absorbing material or an acoustic damping material 118 and/or other material capable of passively inhibiting sound detection by the communication-device audio sensor. Additionally or alternatively, audio-sensor inhibitor 110 may take the form of (or include) a transducer 120, which in turn could take the form of a loudspeaker, a piezoelectric speaker, a magnetostatic speaker, an electrostatic speaker, a ribbon magnetic speaker, a flat panel speaker, a digital speaker, or any other transducer, as will be known to one of skill in the art. Audio-sensor inhibitor 110 could further include a signal generator 122 configured to output pink noise, white noise, and/or random noise (among other possible noise signals) via the transducer. The signal generator may also be configured to output the noise signal for a duration of an encrypted communication. In at least one embodiment, audio-sensor inhibitor 110 includes both acoustic damping material and a transducer (and possibly a signal generator). In at least one other embodiment, the accessory 102 further includes a noise-cancellation module in communication with the microphone 104 and the transducer 120, and the noise-cancellation module is configured to remove noise-signal components from the detected sound. Those of skill in the art will appreciate that audio-sensor inhibitor 110 could take other forms as well.

Figure 2:
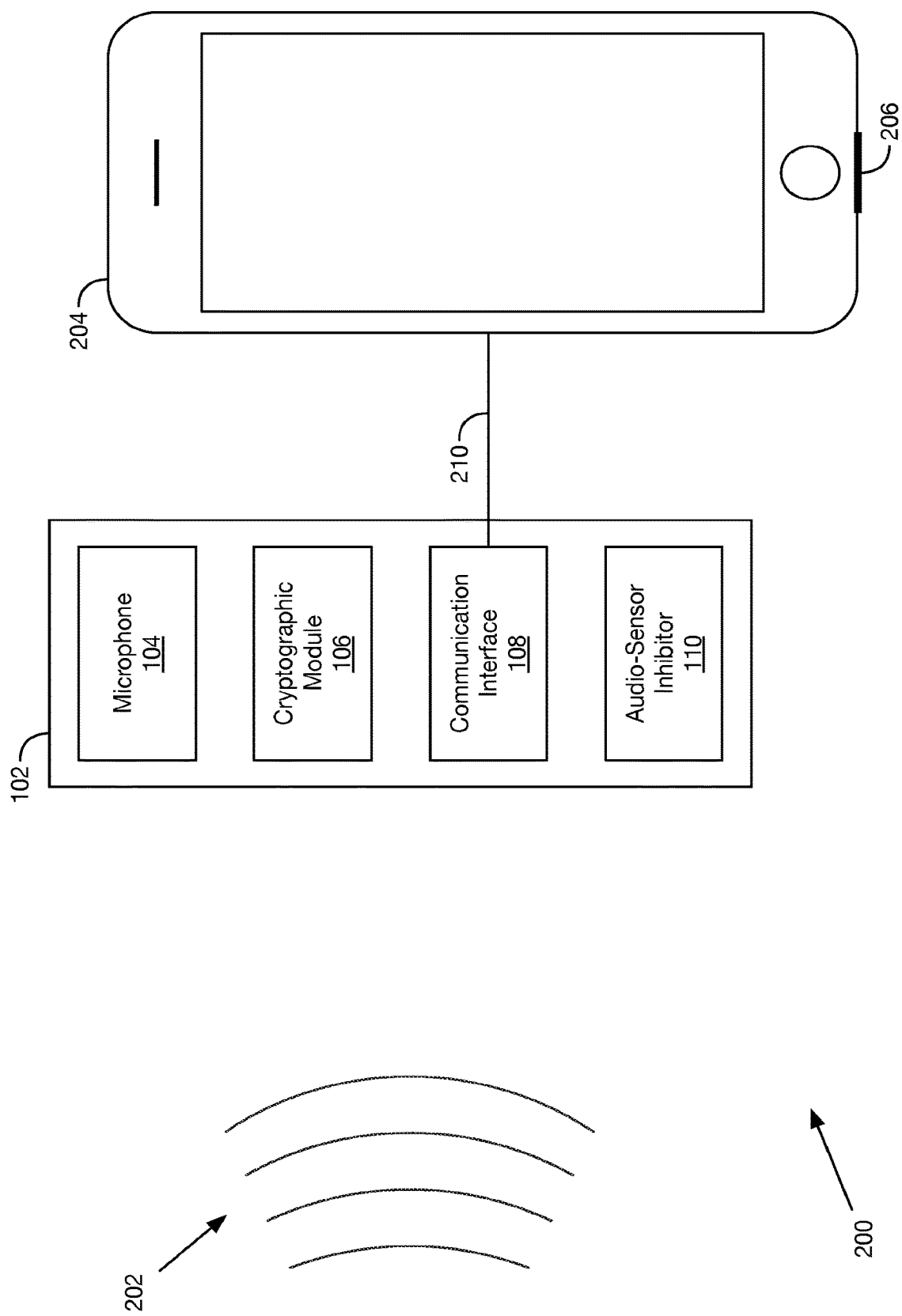
FIG. 2 depicts a communication system, in accordance with at least one embodiment.

FIG. 2 depicts a communication system, in accordance with at least one embodiment. As shown, a communication system 200 includes accessory 102, a sound wave 202, a communication device 204, and a communication link 210. The accessory 102 is the same accessory 102 as depicted in FIG. 1. The sound wave 202 represents sound present near the accessory. Communication device 204 may take the form of (or include) a mobile phone/smart phone, a laptop computer, a desktop computer, a portable media player, a smart watch, a mobile radio, a tablet computer, and/or any other communication device, as known to one of skill in the art. Communication device 204 is depicted as including a communication-device audio sensor 206, which may take a form similar to that of microphone 104, for example. The communication link 210 could be, for example, a wired- and/or wireless-communication link between the accessory and the communication device according to one or more wired and/or wireless protocols, respectively, as described herein.

Figure 3:
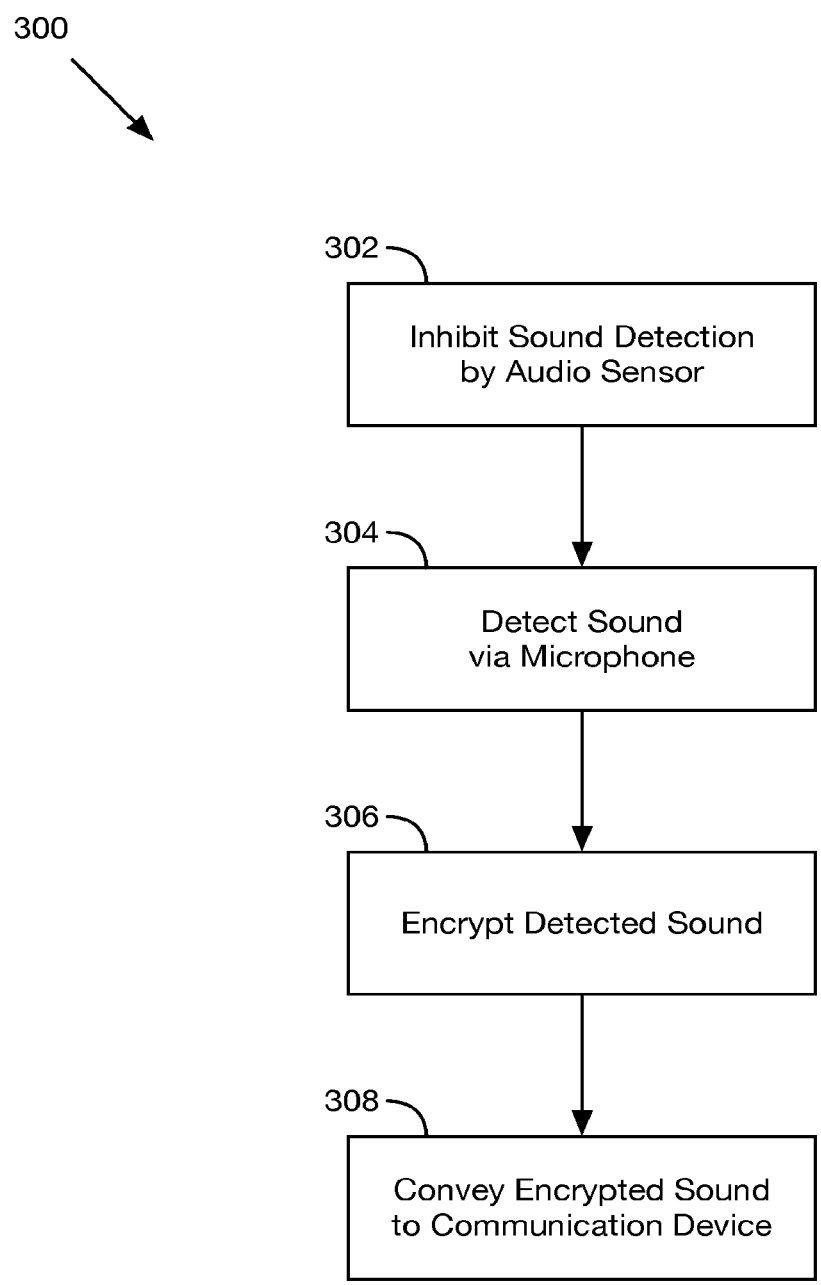
FIG. 3 depicts a flowchart of a method, in accordance with at least one embodiment.

FIG. 3 depicts a flowchart of a method, in accordance with at least one embodiment. The example accessory 102, as depicted in FIGS. 1-2 may be used to implement method 300. The method 300 begins at step 302 with audio-sensor inhibitor 110 inhibiting detection of sound by communication-device audio sensor 206. In an embodiment, audio-sensor inhibitor 110 is positioned adjacent to communication-device audio sensor 206. Additional aspects of method 300 are discussed following the description of FIGS. 4-5.

Figure 4:
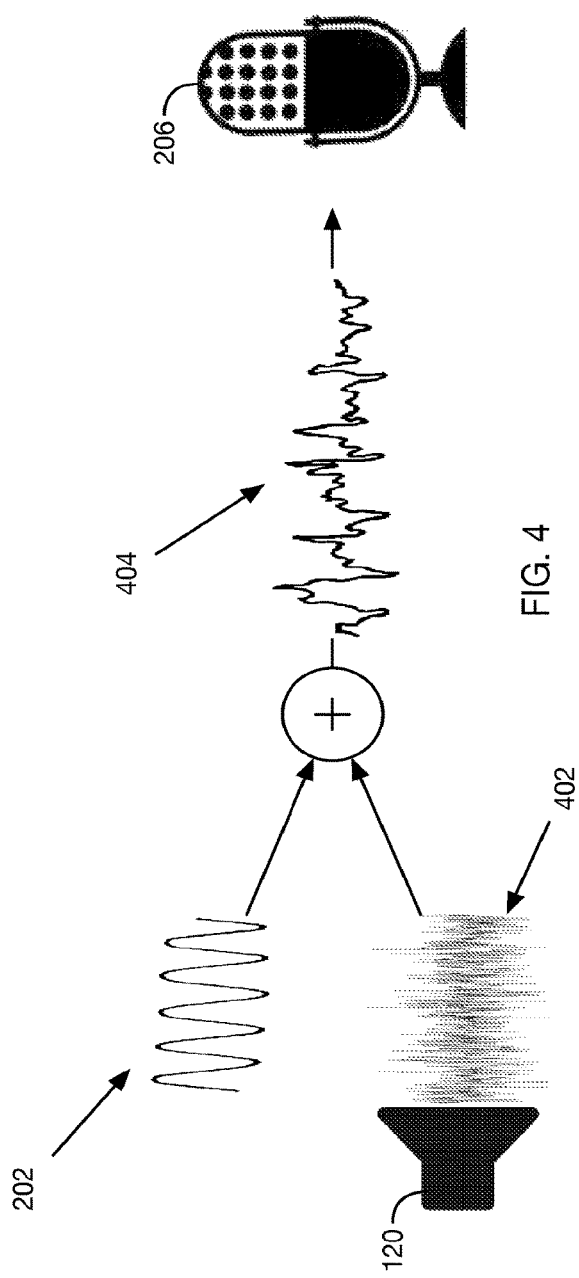
FIG. 4 depicts a first example of audio-sensor inhibition, in accordance with at least one embodiment.

FIG. 4 depicts a first example of audio-sensor inhibition, in accordance with at least one embodiment. The example accessory 102, as depicted in FIGS. 1-2, may be used to inhibit the communication device's audio sensor from accurately detecting the sound wave 202. In. FIG. 4, the audio-sensor inhibitor takes the form of transducer 120 that outputs a noise signal 402, which could take the form of (or include) white noise, pink noise, and/or random noise, as examples. In at least one embodiment, the transducer is coupled to signal generator 122 to provide an electrical signal corresponding to noise signal 402.

As shown, noise signal 402 is combined with sound wave 202 to produce an inhibited signal 404. Though sound wave 202 is shown as a sine wave in the illustrated example, it should be understood that sound wave 202 may take other forms (e.g., sound waves corresponding to speech, music, etc.). Inhibited signal 404 may be the result of constructive or destructive interference of sound pressure waves. As depicted, inhibited signal 402 varies greatly from sound wave 202, thus potentially providing an extra measure of security for any eavesdropper potentially listening to communication-device audio sensor 206.

In at least one embodiment, signal generator 122 is configured to output noise signal 402 for a duration of an encrypted communication session, though in some embodiments, signal generator 122 to output noise signal 402 for other durations (such as a user-specified duration).

Figure 5:
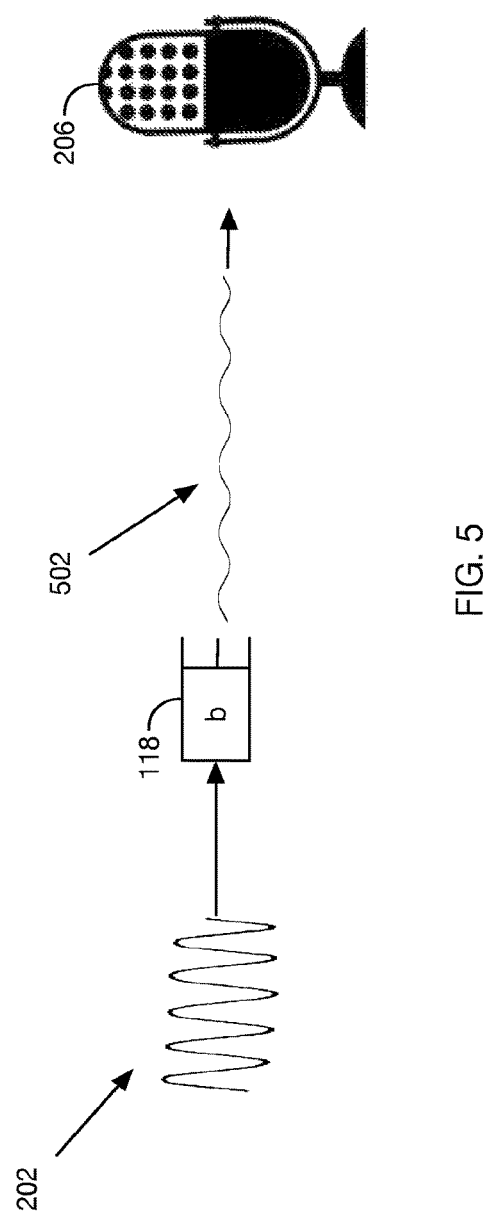
FIG. 5 depicts a second example of audio-sensor inhibition, in accordance with at least one embodiment.

FIG. 5 depicts a second example of audio-sensor inhibition, in accordance with at least one embodiment. Similar to the description of FIG. 4, the example accessory 102, as depicted in FIGS. 1-2, may be used to inhibit the communication device's audio sensor from accurately detecting the sound wave 202. Audio-sensor inhibitor 110 takes the form of an audio dampening material 118, which may absorb some or all acoustic energy from sound wave 202, thus potentially preventing the acoustic energy from reaching communication-device audio sensor 206. Audio dampening material 118 may be placed adjacent to or in the vicinity of communication-device audio sensor 206—e.g., in between sound wave 202 and communication-device audio sensor 206. The symbol "b" within audio dampening material 118 represents the amount of damping by the material: a higher b will result in more sound energy being absorbed by audio dampening material 118.

Reduced amplitude sound wave 502 represents the result of sound wave 202 passing through audio dampening material 118. With sufficient damping applied, reduced amplitude sound wave 502 may be unintelligible to an eavesdropper listening to communication-device audio sensor 206.

Returning to FIG. 3, at step 304, microphone 104 detects sound wave 202 and, at step 306, cryptographic module 106 generates encrypted audio data based on the detected sound. In at least one embodiment, cryptographic module 106 includes an encryption module configured to generate encrypted audio data based on sound detected by microphone 104. Cryptographic module 106 may generate the encrypted audio data during at least an encrypted communication session. In at least one other embodiment, cryptographic module 106 includes a decryption module configured to decrypt inbound encrypted information (e.g., encrypted information received from a communication device).

At step 308, communication interface 108 conveys the encrypted audio data (generated at step 306) to communication device 204. Communication interface 108 may be configured to provide encrypted audio to communication device 204 and/or to receive encrypted audio from communication device 204, as examples. Communication interface 108 may communicate with cryptographic module 106 to relay encrypted audio data between communication device 204 and the cryptographic module. Communication interface 108 may provide the encrypted audio via a communication link 210, which could be wired- and/or wireless-communication link according to one or more wired and/or wireless protocols, respectively, as described herein.

Communication device 204 may be configured to receive the encrypted audio data to be transmitted to a wide area network (WAN). In at least one embodiment, communication device 204 is configured to pass encrypted audio data unaltered to a mobile transmitter. If communication device 204 cannot be configured to pass the encrypted audio data unaltered to a WAN, a wired connection may be utilized to pass the encrypted audio data to the mobile transmitter.

Figure 6:
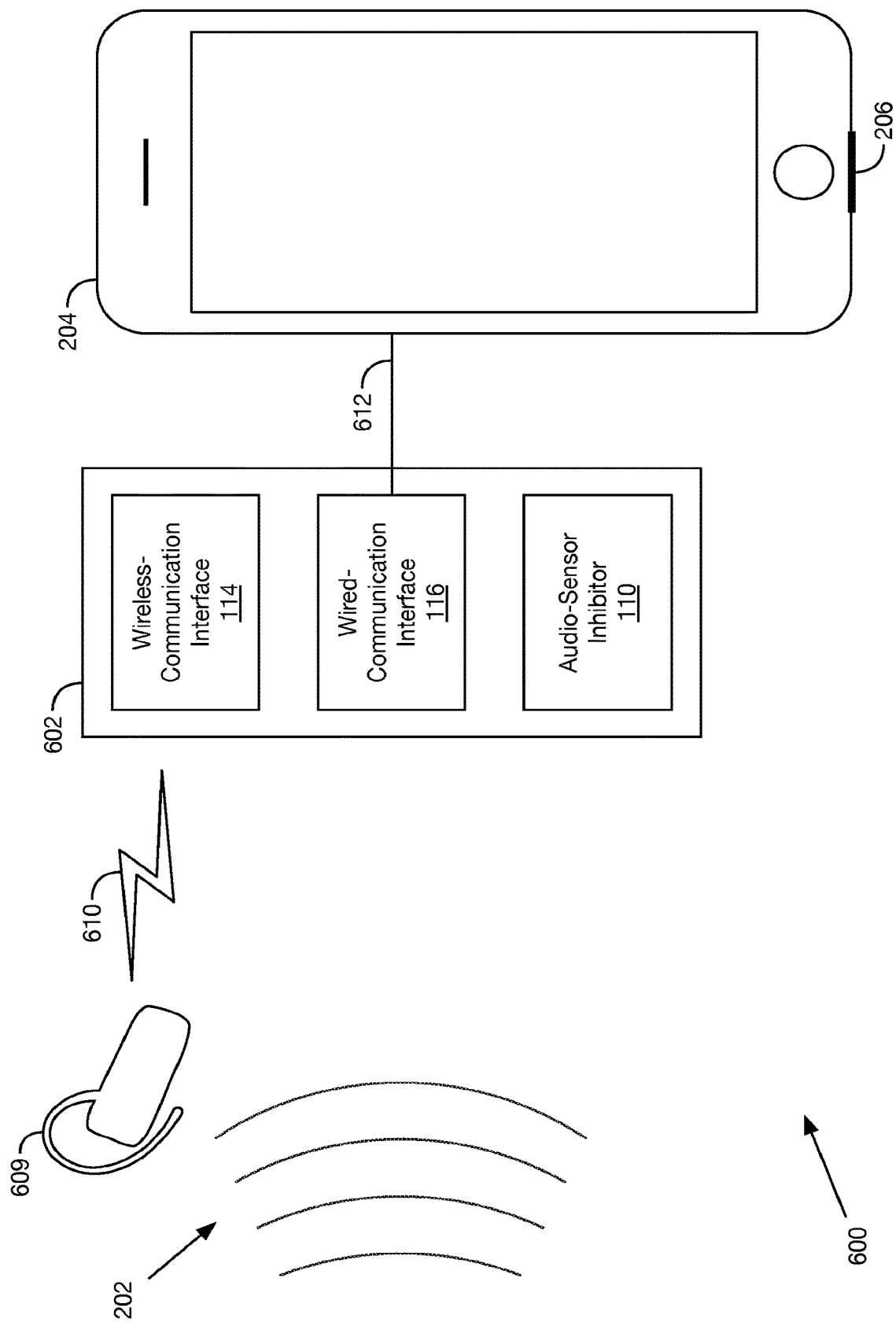
FIG. 6 depicts a communication system, in accordance with at least one embodiment.

FIG. 6 depicts a communication system, in accordance with at least one embodiment. As shown, a communication system 600 includes the sound wave 202 and the communication device 204 from FIG. 2, an accessory 602, an external accessory 609, a communication link 610 and a communication link 612. Accessory 602 includes wireless communication interface 114, wired communication interface 116, and audio-sensor inhibitor 110, which are similar to the components of accessory 102 of FIG. 1. External accessory 609 could take the form of (or include) a wireless/wired headset, a camera, a keyboard, a display screen, a touchscreen video display or any other device capable of performing the external-accessory functions described herein.

Figure 7:
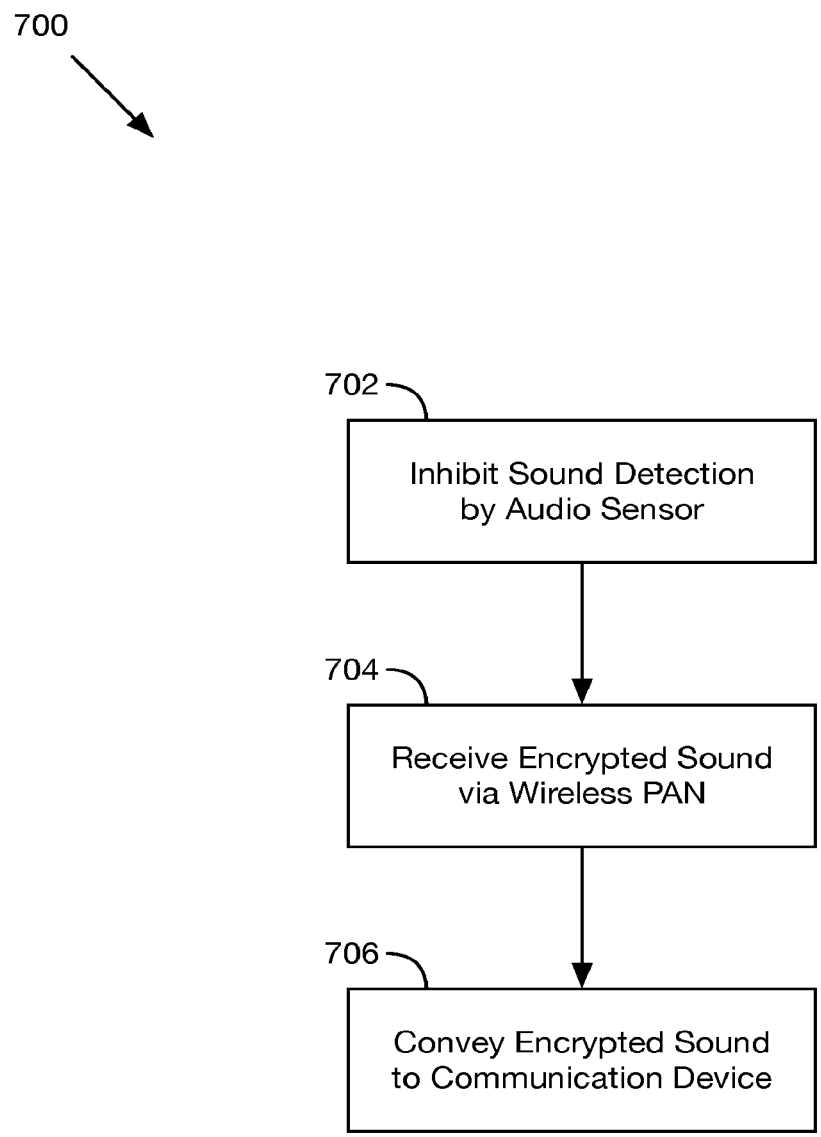
FIG. 7 depicts a flowchart of a method, in accordance with at least one embodiment.

FIG. 7 depicts a flowchart of a method, in accordance with at least one embodiment. The accessory 602 of FIG. 6 may be used to perform the method 700. The method 700 begins at step 702 with audio-sensor inhibitor 110 inhibiting detection of sound by communication-device audio sensor 206. The audio-sensor inhibitor 110 may inhibit detection of sound by any of the means described herein, to include the examples depicted in FIGS. 4-5.

At step 704, wireless communication interface 114 receives encrypted audio data from external accessory 609 via a wireless PAN communication link 610. The audio data may represent sound that was detected by external accessory 609 (perhaps via an external-accessory microphone), and the audio data may have been encrypted by external accessory 609 (e.g., via an external-accessory cryptographic module). The external accessory 609 may also have the capability to detect images or receive text input data from an associated camera or keyboard, respectively. Data representing the received images or text may be encrypted by a similar method as the encryption of the detected sound by the external accessory 609. The encrypted data may also be transmitted via the communication link 610. The external accessory 609 also has the ability to receive encrypted data which represents text and images, decrypt the encrypted data and clearly display the unencrypted data via a video screen or touch screen display.

At step 706, wired communication interface 116 conveys the encrypted audio data (received at step 704) to communication device 204 via a wired communication link 612.

Figure 8:
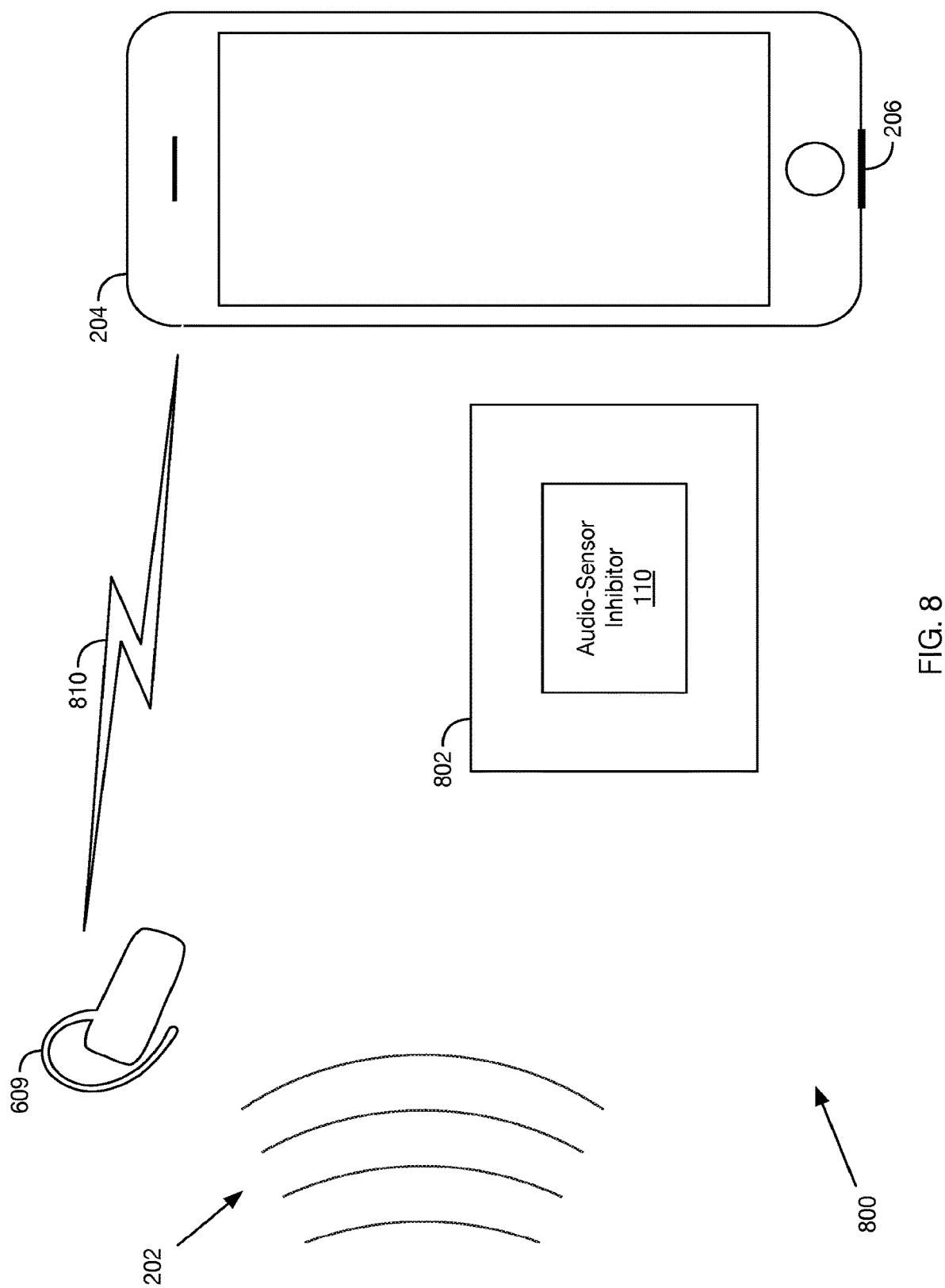
FIG. 8 depicts a communication system, in accordance with at least one embodiment.

FIG. 8 depicts a communication system, in accordance with at least one embodiment. As shown, a communication system 800 includes an accessory 802, an external accessory 609, and the sound wave 202 and the communication device 204 as depicted in FIG. 2. Accessory 800 includes audio-sensor inhibitor 110 arranged to be positioned adjacent to a communication-device audio sensor 206. In the illustrated communication system, encrypted audio data is exchanged between communication device 204 and external accessory 609 via a communication link 810, and audio-sensor inhibitor 110 inhibiting detection of sound by communication-device audio sensor 206—sound such as speech intended for reception by a microphone of external accessory 609. The audio-sensor inhibitor 110 may inhibit detection of sound by any of the means described herein, to include the examples depicted in FIGS. 4-5.

Figure 9:
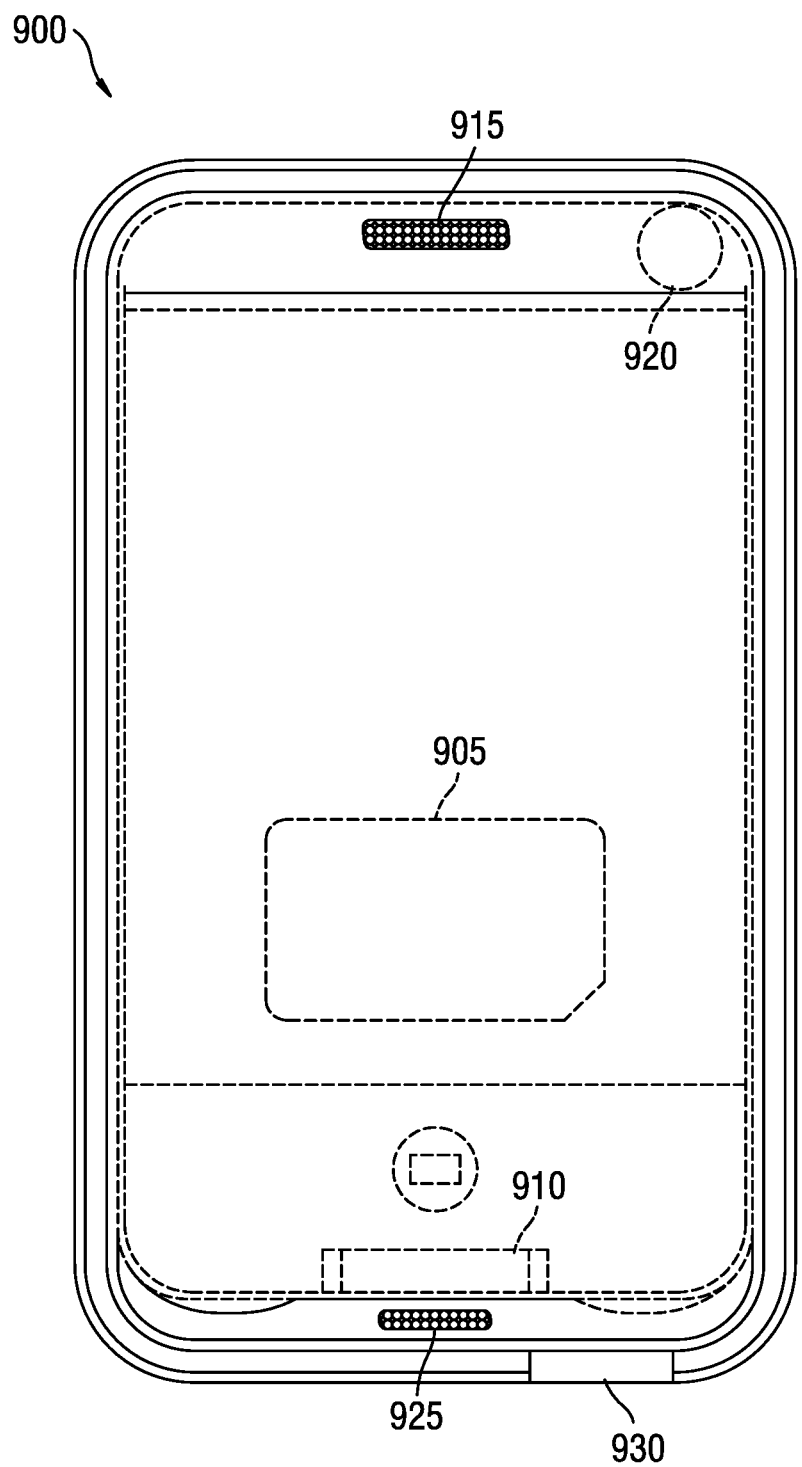
FIG. 9 depicts a example structure of an accessory, in accordance with at least one embodiment.

FIG. 9 depicts an example structure of an accessory, in accordance with at least one embodiment. As shown, an accessory 900 includes a processor 905, a communication interface 910, a speaker 915, an image-sensor inhibitor 920, a microphone 925, and an audio sensor inhibitor 930.

In an embodiment, communication interface 910 includes both a communication-interface plug and a communication-interface receptacle. The communication-interface plug may be arranged for connection to a given type of communication-device receptacle (e.g., USB, Apple Lightning™, etc.) of communication device 204, and the communication-interface receptacle may be arranged to receive a plug of that same type. Communication interface 910 may be configured to relay, to the communication-device receptacle via the communication-interface plug, any communication received via the communication-interface receptacle (and/or vice versa). The communication-interface plug and communication-interface receptacle may function to, e.g., allow use of the communication-device receptacle while accessory 900 is attached to communication device 204—for example, to allow communication interface 910 to convey encrypted audio data to communication device 204 via the communication-interface plug and the communication-interface receptacle, and/or to convey, to communication device 204, data in addition (or instead of) any encrypted audio data.

Processor 905 may include part or all of cryptographic module 106, communication interface 108, audio-sensor inhibitor 110, and/or any combination of these, as examples. Processor 905 may take the form of one or more processors of any type deemed suitable by those of skill in the relevant art, some examples including a microprocessor and a dedicated digital signal processor (DSP). In at least one embodiment, processor 905 is configured to encrypt audio data and/or to provide encrypted audio data to a communication device via a wired- and/or wireless-communication link. Processor 905 may additionally (or alternatively) be configured to decrypt inbound encrypted audio data received from, for example, a communication device.

Image-sensor inhibitor 920 may take the form of (or include) a non-transparent covering, a bright light shining on the image sensor, or any other means of obscuring an image sensor, and may function to inhibit detection of video or pictures by an image sensor of a communication device.

In at least one embodiment, audio-sensor inhibitor 930 is placed directly over a communication-device audio sensor. Audio-sensor inhibitor 930 may be retractable, thus potentially allowing the inhibitor to be retracted when accessory 900 is not in use so that the communication-device audio sensor may be used for an unencrypted communication session, for example.

Figure 10:
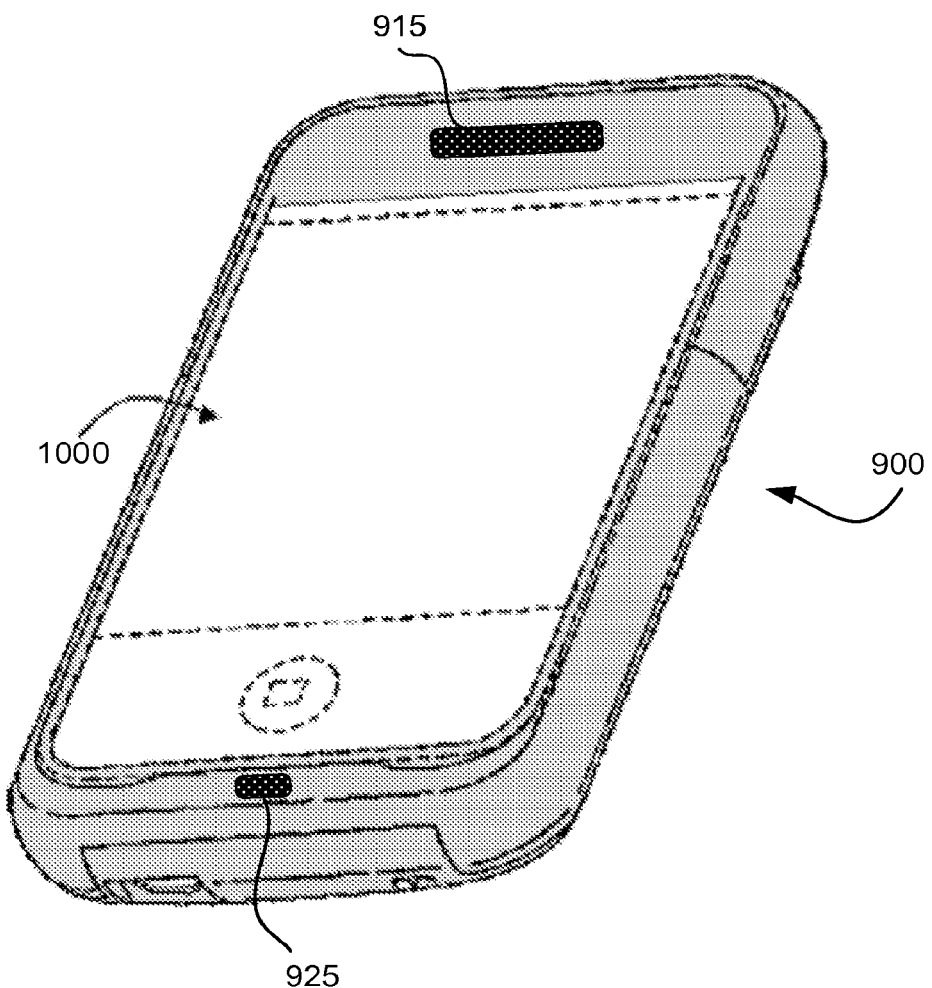
FIG. 10 depicts an example structure of an accessory, in accordance with at least one embodiment.

FIG. 10 depicts an example structure of an accessory, in accordance with at least one embodiment. As shown, accessory 900 takes the form of a smartphone case for a communication device 1000. Though communication device 1000 is depicted as a mobile phone/smartphone, the communication device could instead (or additionally) take other forms, as discussed throughout this detailed description.

In the example embodiments, a plurality of components may exist to conform to different models of communication devices. For example, an accessory may include multiple audio-sensor inhibitors or image-sensor inhibitors, each arranged to be positioned adjacent to multiple communication-device audio sensors or image sensors, respectively, for communication devices that include multiple sensors.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   an audio-sensor inhibitor configured to inhibit detection of sound by an audio sensor of a communication device, wherein the audio-sensor inhibitor is positioned adjacent to the audio sensor of the communication device; and
   a secure communication interface coupled to the audio-sensor inhibitor, the secure communication interface configured to communicate encrypted audio data from the secure communication interface to the communication device, wherein the secure communication interface is configured to
   (i) detect the sound inhibited from being detected by the audio sensor of the communication device;
   (ii) generate the encrypted audio data by encrypting the detected sound using a cryptographic module; and
   (iii) provide the generated encrypted audio data to the communication device inhibited from detecting the sound.

2. The apparatus of claim 1, wherein the audio-sensor inhibitor includes an acoustic dampening material.

3. The apparatus of claim 1, wherein the audio-sensor inhibitor includes a transducer to output a noise signal.

4. The apparatus of claim 3, wherein the audio-sensor inhibitor includes a signal generator to generate, via the transducer, the noise signal.

5. The apparatus of claim 4, wherein the noise signal is one or more of pink noise, white noise, and random noise.

6. The apparatus of claim 4, wherein the signal generator generates, via the transducer, the noise signal in response to a triggering event.

7. The apparatus of claim 6, wherein the triggering event includes commencement of an encrypted communication session.

8. The apparatus of claim 4, wherein the signal generator generates the noise signal for a duration of an encrypted communication session.

9. The apparatus of claim 3, further comprising a noise-cancellation module configured to remove noise-signal components from sound detected by the secure communication interface.

10. The apparatus of claim 1, wherein the apparatus is disposed on the communication device.

11. The apparatus of claim 1, further comprising an image-sensor inhibitor, wherein the apparatus is disposed on the communication device, the communication device further comprises an image sensor, and the image-sensor inhibitor is configured to obscure the image sensor of the communication device.

12. The apparatus of claim 11, wherein the image-sensor inhibitor is one or more of a non-transparent covering and a light source.

13. The apparatus of claim 1, wherein the secure communication interface communicates the encrypted audio data from the secure communication interface to the communication device via a communication link.

14. The apparatus of claim 1, wherein the secure communication interface is further configured to decrypt an inbound encrypted audio data received from the communication device.

15. An apparatus comprising:
   an audio-sensor inhibitor to inhibit detection of sound by an audio sensor of a communication device, wherein the audio-sensor inhibitor is positioned adjacent to the audio sensor of the communication device; and
   a communication interface coupled to the audio-sensor inhibitor, the communication interface configured to receive an inbound wireless communication data transmitted from an external accessory that includes a secure communication interface, the inbound wireless communication data including encrypted audio data of the sound inhibited from being detected by the audio-sensor inhibitor, the communication interface including a communication link to enable relay of the encrypted audio data between the communication interface and the communication device inhibited from detecting the sound.

16. The apparatus of claim 15, wherein the communication interface enables transmission of an outbound wireless communication data to the external accessory, the outbound wireless communication data including encrypted audio data received from the communication device.

17. The apparatus of claim 15, wherein the communication interface is a personal area network (PAN) wireless-communication interface.

18. The apparatus of claim 15, wherein the external accessory is a Bluetooth-enabled headset.

19. The apparatus of claim 15, wherein the audio-sensor inhibitor includes an acoustic dampening material.

20. The apparatus of claim 15, wherein the audio-sensor inhibitor includes a transducer to output a noise signal.

\* \* \* \* \*